United States Patent [19]
Afeyan

[11] Patent Number: 4,999,074
[45] Date of Patent: Mar. 12, 1991

[54] METHOD FOR THE PRODUCTION OF AN AIR MATTRESS

[75] Inventor: Levon Afeyan, Hampstead, Canada

[73] Assignee: Afeyan Industries Inc., Montreal, Canada

[21] Appl. No.: 471,772

[22] Filed: Jan. 29, 1990

Related U.S. Application Data

[62] Division of Ser. No. 304,317, Jan. 31, 1989, Pat. No. 4,914,771.

[51] Int. Cl.[5] .......................... B32B 31/12; B32B 3/26
[52] U.S. Cl. .......................................... 156/204; 5/449; 5/455; 156/145; 156/292; 156/308.4; 428/72; 428/178; 428/181; 428/188
[58] Field of Search ..................... 5/449, 455; 156/145, 156/204, 210, 292, 308.4; 428/72, 178, 179, 181, 188

[56] References Cited

U.S. PATENT DOCUMENTS 4,149,285 4/1979 Stanton .
4,528,704 7/1985 Wegener et al. .

FOREIGN PATENT DOCUMENTS 1044823 12/1978 Canada .
1077173 5/1980 Canada .

*Primary Examiner*—Robert A. Dawson
*Attorney, Agent, or Firm*—Bachman & LaPointe

[57] ABSTRACT

An air inflatable mattress for medical and hospital use is formed from upper and lower layers of flexible, air impervious material joined at a peripheral air impervious seam; laterally extending, elongate, spaced apart pillows extend between side edges of the mattress and are defined by lateral folds formed in the material of the upper layer; the pillows communicate at their opposed ends with longitudinally extending side plenums; the inflated pillows billow against each other in stress relieving contact effective to relieve air pressure bursting forces generated in the mattress.

9 Claims, 4 Drawing Sheets

FIG. 1
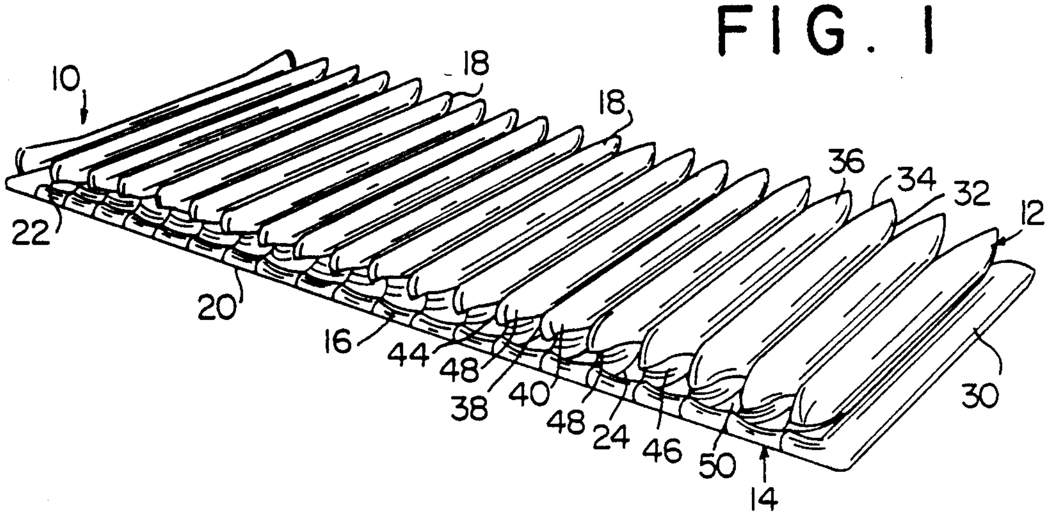
FIG. 2
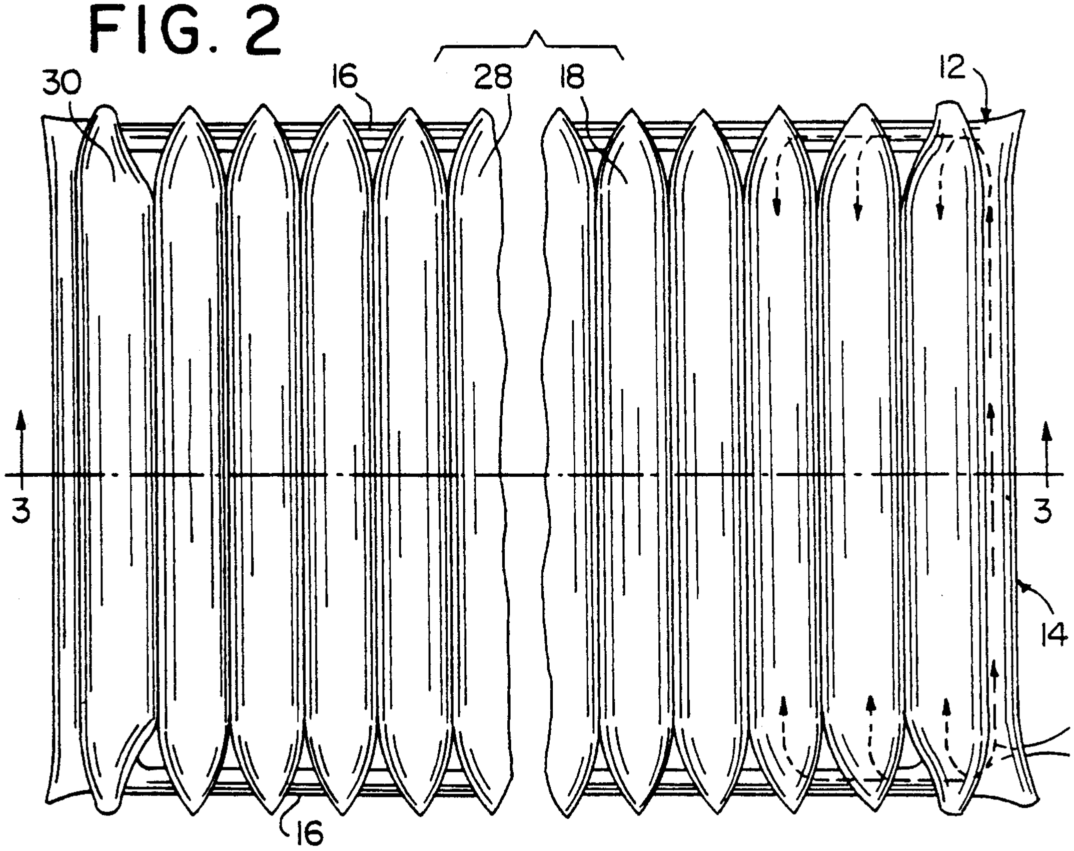
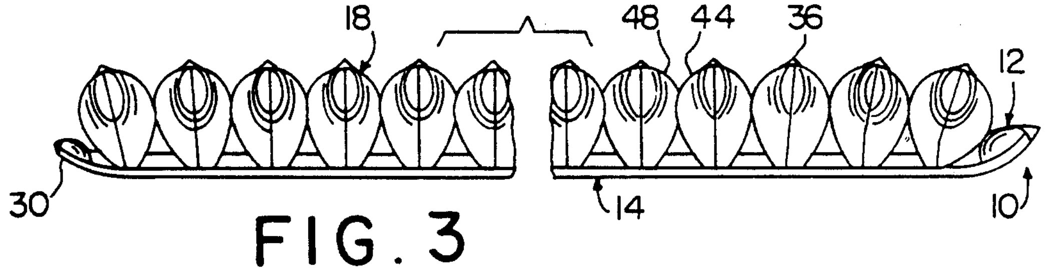
FIG. 3

METHOD FOR THE PRODUCTION OF AN AIR MATTRESS

This is a division of application Ser. No. 304,317 filed Jan. 31, 1989 and now Pat. No. 4,914,771.

CROSS REFERENCE TO RELATED APPLICATIONS

This application is related to U.S. Design Pat. application 269,559, filed Nov. 10, 1988, of the same inventor.

BACKGROUND OF THE INVENTION (i) Field of the Invention

This invention relates to an air inflatable mattress, a method for its manufacture and apparatus for use in the manufacture; more especially the invention is concerned with air inflatable mattresses for medical or hospital use.

(ii) Description of the Prior Art

Air mattresses have been proposed for medical and hospital use, for example to minimize development of bed sores and to support patients who have suffered from extensive burns.

In such mattresses it would be advantageous to have the supporting force of the internal pressurized air distributed uniformly beneath the support surface, and to so construct the mattress that deflating external force applied to one part of the support surface does not unduly affect the internal air pressure exerted on the support surface of other parts of the air mattress.

Previous proposals for air mattresses have been relatively complex. One prior proposal employs a plurality of discrete, inflatable members assembled together, each with a pressurized air supply as in Canadian Patent 1,077,173, L. A. Hopkins, issued May 6, 1980. Another prior proposal requires a complex mandrel which is coated with a film forming material to form a plurality of air inflatable cells, as in Canadian Patent 1,044,823, R. H. Graebe, issued Dec. 19, 1978.

U.S. Pat. No. 4,149,285, A. N. Stanton, issued Apr. 17, 1979, proposes an air mattress with elastic upper and lower support walls interconnected at a multiplicity of points by internal flexible ties that restrain separation of the support walls. U.S. Pat. No. 4,528,704, J. Wegener, issued July 16, 1985, employs top, intermediate and bottom flexible sheets as well as a semi-rigid backing; the top and intermediate sheets form high pressure tubes.

SUMMARY OF THE INVENTION

It is an object of the present invention to provide an air mattress in which the air pressure is distributed uniformly to the support surface Another object of the invention is to provide an air mattress formed from upper and lower sheets of flexible, air impervious material.

Still another object of the invention is a method and apparatus for manufacture of the air mattress.

In accordance with the invention an air inflatable mattress comprises an upper layer of flexible air impervious material and a lower layer of flexible air impervious material; and an air impervious, continuous, peripheral seam joins material of the upper and lower layers together at their outer edges.

In accordance with one embodiment the lower layer is generally planar over a major portion of its surface and the upper layer has a plurality of elongate, air inflatable, pillow-forming portions defined by opposed walls of elongate folds in the material of the upper layer.

In accordance with another embodiment of the invention a plurality of elongate, generally parallel, air-inflatable pillow-forming portions is defined in the upper layer, the pillow-forming portions being in side-by-side spaced apart relationship extending across the mattress between opposed side seams. The pillow-forming portions have a pair of opposite side walls and an outwardly facing air-impervious pillow seam connecting the side walls together at their outer extremities adjacent the opposed side seams. The pillow-forming portions are spaced such that on being inflated with air, adjacent pillow-forming portions billow against each other in pressure strain relieving contact effective to relieve bursting forces at the pillow seams.

In another embodiment of the invention a plurality of elongate, generally parallel, air-inflatable pillow-forming portions is defined in the upper layer, the pillow-forming portions being in side-by-side spaced apart relationship extending laterally of said mattress; and a pair of elongate, spaced apart plenums defined between said upper and lower layers, extends between opposed end seams, one of the plenums being adjacent each of the side seams. The pillow-forming portions are in air flow communication at their opposed extremities with the spaced apart plenums.

The mattresses of the invention will, more particularly, include an air inlet for continuous introduction of inflating air under pressure into the mattress, and air outlet means for continuous escape of air from the inflated mattress. In a preferred embodiment the air outlet means comprises a plurality of orifices in the pillow-forming portions for continuous retarded escape of air from the inflated mattress.

In another aspect of the invention there is provided a method of making an air mattress comprising: (i) feeding a first predetermined length of flexible air impervious material having a pair of spaced apart longitudinal edges, from a supply, (ii) forming a laterally extending fold in the first predetermined length, the fold being defined by fold lines extending laterally between the spaced apart longitudinal edges, and having outer fold edges defined by a second predetermined length of the longitudinal edges, (iii) forming an air impervious seam at opposed ends of each fold, (iv) repeating steps (i) to (iii) a predetermined number of times to produce a desired length of the flexible, air impervious material having a plurality of pillow-forming elements defined by the laterally extending folds in side-by-side relationship, in which each fold is seamed at outer ends thereof, (v) severing the desired length in (iv) from the supply to provide a flexible, elongate upper layer-forming member having spaced apart longitudinal edges and spaced apart end edges, (vi) disposing the upper layer-forming member on a lower layer of a flexible, air impervious material having spaced apart longitudinal edges and spaced apart end edges in opposed relationship with the corresponding edges of the upper layer-forming member, (vii) seaming the opposed edges to form an air chamber between the upper layer-forming member and the lower layer, and joining opposed portions of the upper and lower layers together between adjacent pillow-forming elements.

In still another aspect of the invention there is provided an apparatus for manufacture of a flexible top member of an air mattress comprising: (a) feed means for intermittent feeding of a first predetermined length of flexible, air impervious material having spaced apart longitudinal edges, from a source, (b) means for supporting the predetermined length in a planar configuration with a laterally extending fold therein defined by fold lines extending laterally between the spaced apart longitudinal edges, the fold having outer fold edges defined by a second predetermined length of the longitudinal edges, and (c) means for removing end portions of the fold and forming air impervious seams at opposed ends of the fold.

BRIEF DESCRIPTION OF DRAWINGS

The invention is illustrated in an especially preferred embodiment by reference to the accompanying drawing in which:

FIG. 1 is a perspective view of an air inflatable mattress of the invention;

FIG. 2 is a top plan view of the mattress of FIG. 1;

FIG. 3 is a side cross-section on line 3—3 of FIG. 2;

DESCRIPTION OF PREFERRED EMBODIMENTS WITH REFERENCE TO THE DRAWINGS

Figure 4:
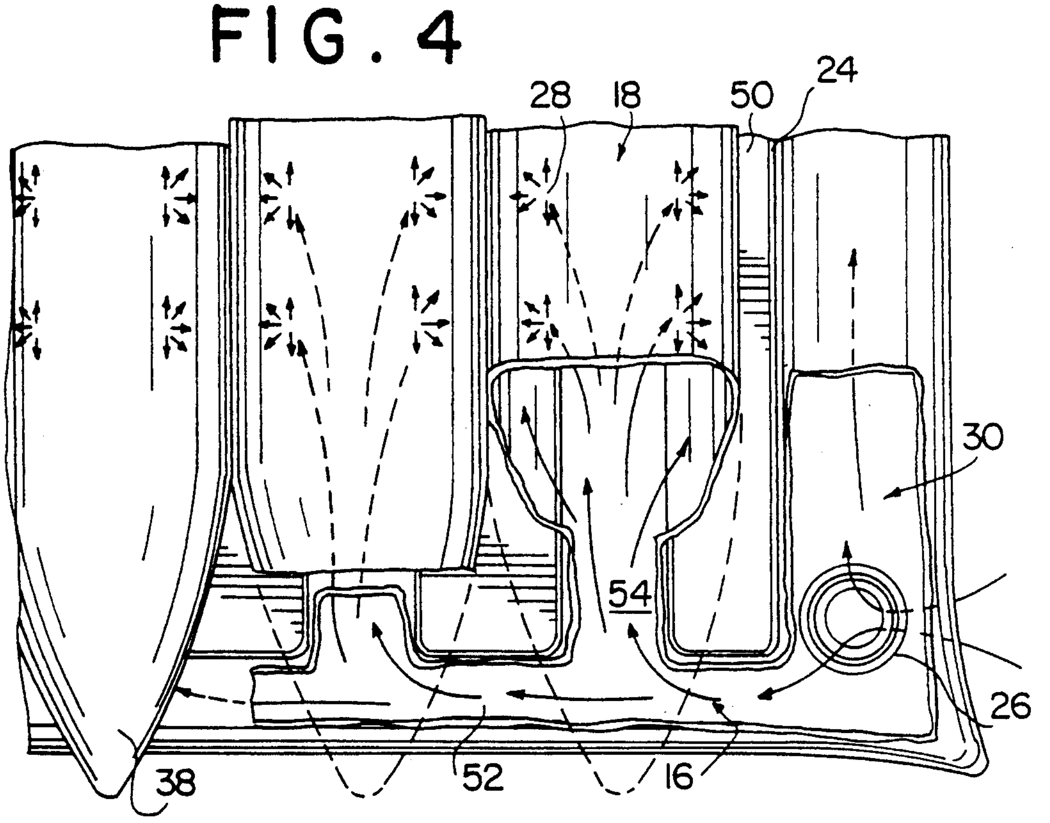
FIG. 4 is a fragmentary view partly cut away of the mattress of FIG. 1 demonstrating the path of air flow in the mattress.

With further reference to FIGS. 1 to 5 and 7, An air mattress 10 has an upper layer 12, a lower layer 14, a pair of spaced apart longitudinally extending side plenums 16 and a plurality of laterally extending elongate pillows 18.

The pillows 18 are in side-by-side spaced apart, generally parallel relationship extending generally perpendicularly of the plenums 16.

A peripheral seam 20 including opposed side seams and opposed end seams connects upper layer 12 and lower layer 14; a pillow seam 22 is associated with the ends of each pillow 18 and defines the closed ends of each pillow 18; (see also FIG. 7), each pillow seam 22 extends to the peripheral seam 20 A spacer seam 24 of generally elongate rectangular outline joins upper layer 12 and lower layer 14 between each pair of adjacent pillows 18 and terminates spaced from peripheral seam 20. The spacing between the ends of each spacer seam 24 and the peripheral seam 20 define, in part, the plenums 16.

An air inlet 26 is formed in lower layer 14 at one corner of air mattress 10 and a plurality of spaced apart escape orifices are defined in pillows 18.

End chambers 30 adjacent the outermost pillows 18 extend between plenums 16; and the air inlet 26 is disposed in lower layer 14 at the junction of an end chamber 30 and plenum 16.

Each pillow 18 has side walls 32 and 34 and a top 36. An outwardly extending nose 38 is formed at the outer ends of each pillow 18, a hollow 40 being formed between each nose 38 and the adjacent portion of plenum 16.

Nose 38 has side walls 42 and 44 and hollow 40 has walls 46 and 48.

The side walls 42 and 44 of each nose 38 and the walls 46 and 48 of each hollow 40, meet at pillow seam 22.

The spacer seams 24 each define a non-inflating cavity 50 between upper and lower layers 12 and 14 and extending between adjacent pillows 18.

The noses 38 preferably project beyond the side edges of the plenums 16. In this way the noses 38 may overlie support structures for the mattress and protect the patient from contact with sharp edges of such structure.

With particular reference to FIG. 4, there is shown an air flow passage 52 within air mattress 10. In particular the air enters via air inlet 26 and flows in the direction shown by the arrows in FIG. 4 along plenum 16 and end chamber 30 from air inlet 26. As shown by the flow arrows in FIG. 4, the air flows from the plenum 16 through an air mouth, 54 into each pillow 18. It will be understood that the air flowing along end chamber 30 shown in FIG. 4 will enter the opposed plenum 16 (not shown) from which it will enter the opposed ends (not shown) of the pillows 18 through identical air mouths 54, so that air flows into each pillow 18 from opposed ends via the opposed plenums 16. When sufficiently inflated, air under pressure exits slowly from the air escape orifices 28. The dimensions of orifices 28 are such that the escape of pressurized air is retarded whereby the mattress is maintained inflated so long as the flow of pressurized air into mattress 10 through air inlet 26 is maintained.

Figure 5:
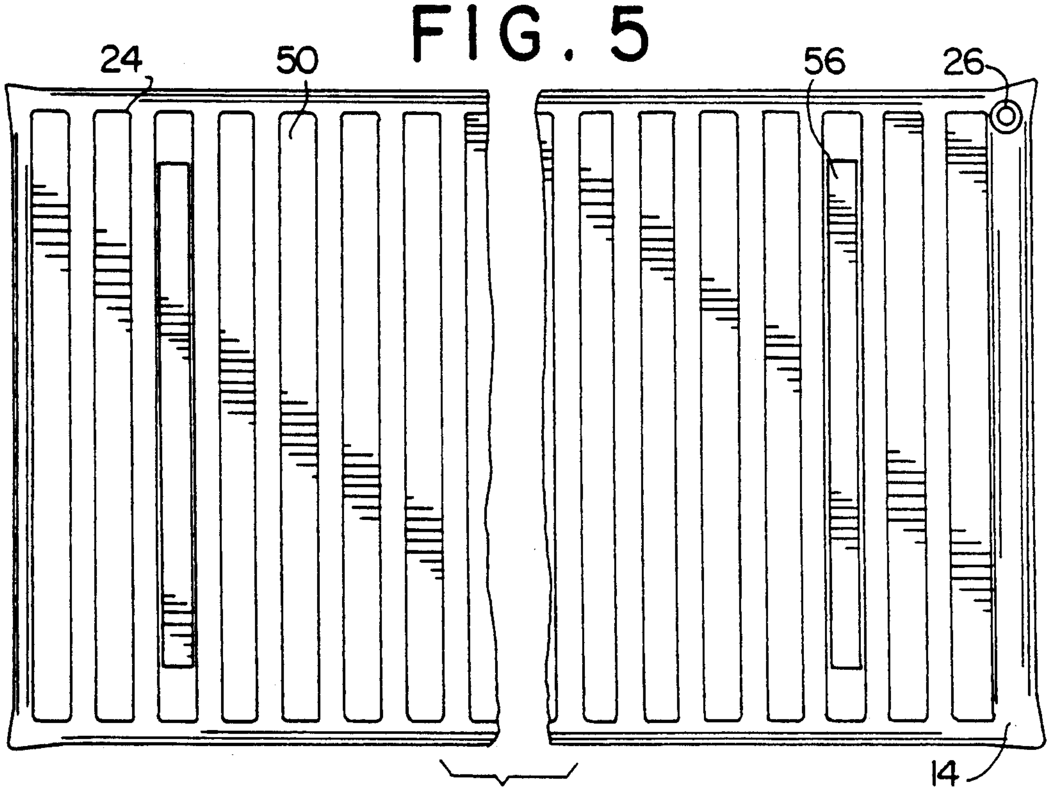
FIG. 5 is a bottom plan view of the mattress of FIG. 1.

With further reference to FIG. 5, VELCRO (Trademark, for an Insure management) panels are secured to the underside of certain of the non-inflatable cavities 50 defined by the spacer seams 24, the Velcro (Trade Mark) panels 56 being employed to securely attach the air mattress 10 to a support surface having corresponding Velcro (Trade Mark) panels. It will be understood that other attachment devices can be employed for securing the air mattress 10 to a support surface.

In operation the air mattress 10 is secured on a bed having a support surface by means of the Velcro panels 56 and similar panels on the support surface of the bed. Air under pressure is introduced into mattress 10 through air inlet 26 and flows along air flow passage 52 and into each of the pillows 18 from the opposed plenums 16. Each pillow 18 is thus inflated independently and application of external pressure to the surface of one pillow 18 does not affect the pressure in adjacent pillows 18. The air under pressure escapes continuously from air escape orifices 28, with retarded flow, after the inflation of mattress 10.

The air pressure within air mattress 10, which must be sufficient to support an individual lying on the mattress, subjects the portions of the mattress 10 adjacent the seams 20, 22 and 24 to stress which tends to produce a bursting force normally capable of forming openings or splitting of the material in the air mattress 10 adjacent such seams with consequent collapse of mattress 10. In accordance with one aspect of the invention, this bursting force is relieved first by the relative dimensions of the adjacent pillows 18, which are such that on inflation, the side walls 42 and 44 of adjacent pillows 18 billow against each other thereby relieving the stress adjacent the pillow seams 22. Bursting forces as a result of the so-called saddle effect are also developed at the pillow seams 22 as a result of the opposed directions of curvature for side walls 42 and 44, on the one hand, of nose 38 and walls 46 and 48, on the other, of hollow 40.

These curvatures in opposite direction, at their juncture, produce stress referred to as the saddle effect. This stress is relieved in part by the billowing of the adjacent pillows 18 against one another which results in a plurality of small elongate pressure relieving creases or folds in the region of the juncture of nose 38 and hollow 40, but is also relieved by employing a sufficiently small radius of curvature for pillow seam 22 at nose 38 and hollow 40.

In general the mattress 10 operates with an inflating air pressure of 6 to 12 inches of water but is capable of operating at inflating air pressure of up to 35 inches of water in view of the relief of bursting pressure achieved in accordance with the invention.

Figure 6:
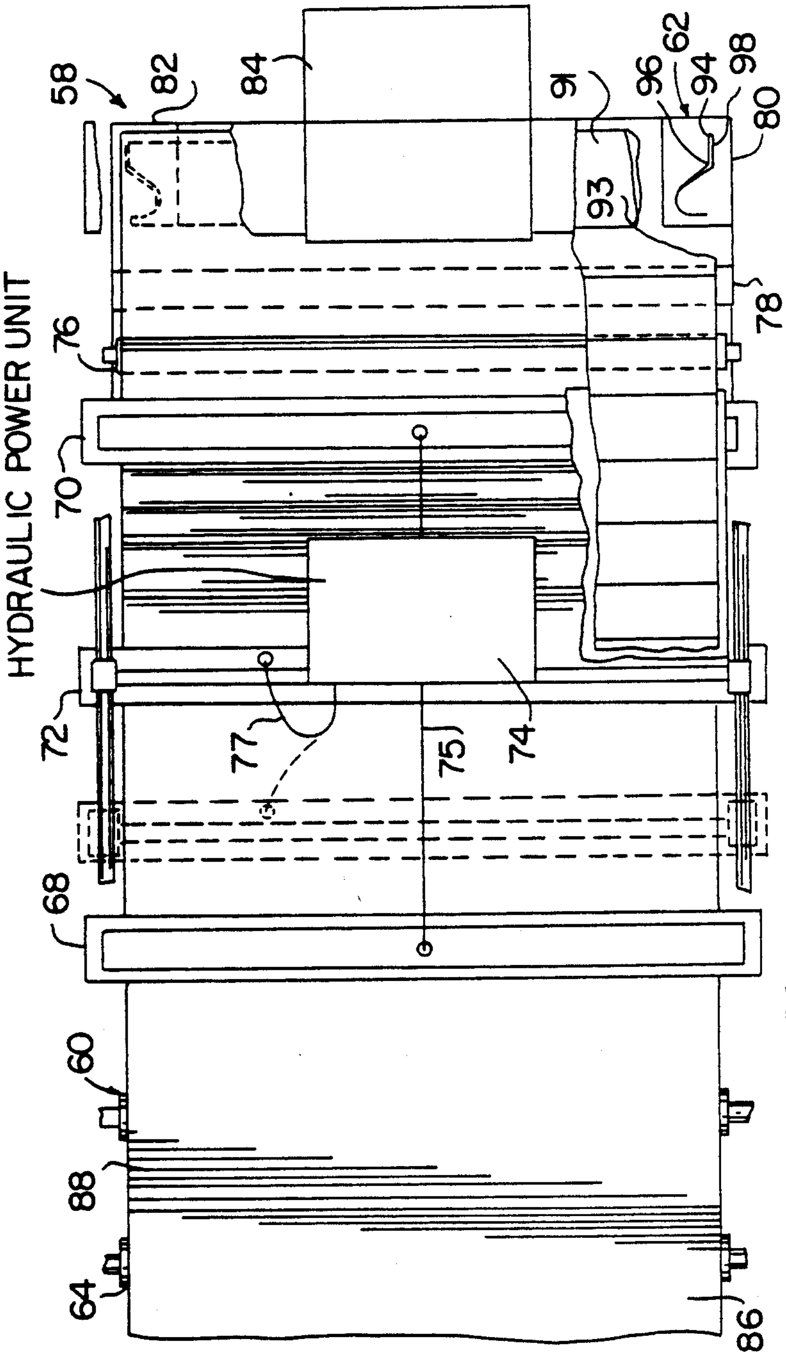
FIG. 6 is a schematic top plan view of an apparatus of the invention for use in the manufacture of the mattress of FIG. 1.
Figure 8:
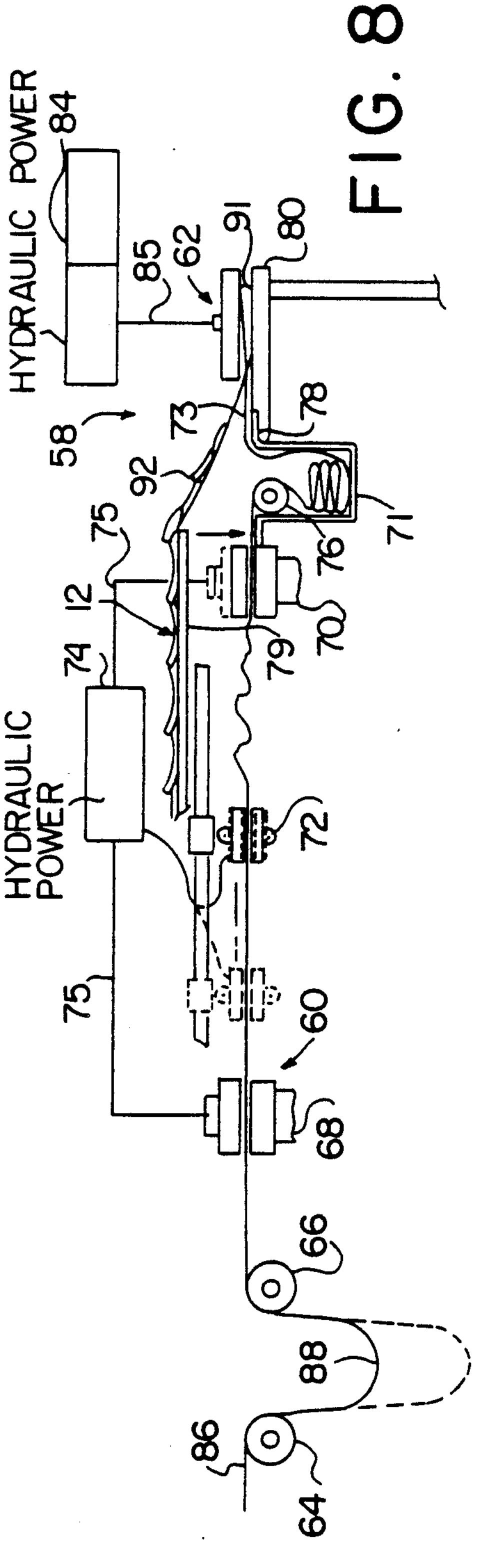
FIG. 8 is a schematic side elevation of the apparatus of FIG. 6.

With further reference to FIGS. 6 and 8, there is illustrated a sealing assembly 58 suitable for forming the upper layer 12 of the air mattress 10.

Sealing assembly 58 includes a sheet delivery system 60 and a weld and cutter machine 62. Sheet delivery system 60 includes guide rolls 64, 66 and 76, fixed clamp assemblies 68 and 70 and reciprocatable clamp assembly 72.

A pneumatic power unit 74 has pneumatic lines 75 communicating with fixed clamp assemblies 68 and 70 and a pneumatic line 77 communicating with reciprocatable clamp assembly 72.

A collector trough 71 having a lip 73 surrounds guide roll 76.

The weld and cutter machine 62 includes a support table 78 having a pair of spaced apart support plates 80, each support plate 80 being associated with a weld and cutter 82. Lip 73 of trough 71 overlies table 78.

A pneumatic power unit 84 communicates with the welders and cutters 82 via pneumatic lines 85.

A cover and support platform 79 overlies sheet delivery system 60.

As particularly shown in FIGS. 6 and 8, a continuous sheet 86 which is to form upper layer 12 is fed from a source (not shown) over guide rollers 64 and 66. A U-shaped loop 88 of the material of sheet 86 is formed between guide rollers 64 and 66, loop 88 eases the unrolling of sheet 86 from the source; particularly in the case of a PVC sheet there is a tendency of sheet 86 to stick to itself, thus hindering the unrolling.

Sheet 86 is fed between the upper and lower plates of the fixed clamp assemblies 68 and 70 as well as between the upper and lower plates of reciprocatable clamp assembly 72.

Sheet 86 which is of flexible air impervious material is thence fed over guide roller 76 and a portion collects in trough 71.

Sheet 86 is fed in the direction of weld and cutter machine 62 in incremental steps, each incremental step involving the advancement of a predetermined length of the material of sheet 86. The predetermined length of material corresponds to the travelling distance, between fixed clamp assemblies 68 and 70, of the reciprocatable clamp assembly 72.

Just prior to the commencement of each incremental advance of material of sheet 86, the sheet is engaged by the fixed clamp assemblies 68 and 70. The fixed clamp assemblies 68 and 70 prevent advancement of sheet 86 and during their engagement with sheet 86 the weld and cutter machine 62 is operated as will be described subsequently. At this stage the reciprocatable clamp assembly 72 is in its extreme forward position in which it is at its closest point to fixed clamp assembly 70 (to the right in FIG. 8).

Reciprocatable clamp assembly 72 is powered by unit 74 through line 77 to travel back to its starting position adjacent fixed clamp assembly 68 (to the left in FIG. 8), during this travel sheet 86 is clamped firmly by the fixed clamp assemblies 68 and 70 but is not clamped by reciprocatable assembly 72.

When the reciprocatable clamp assembly 72 has completed its travel it is activated through hydraulic line 77 to engage the sheet 86 and the fixed clamp assemblies 68 and 70 are deactivated through pneumatic lines 75 to release their hold on sheet 86. Reciprocatable clamp assembly 72 is then activated to travel towards fixed clamp assembly 70 thereby drawing with it length 90 of the material of sheet 86 corresponding to the distance of travel. When reciprocatable clamp assembly 72 has travelled its full distance towards fixed clamp assembly 70, the fixed clamp assemblies 68 and 70 are activated to engage sheet 86 and reciprocatable clamp assembly 72 is deactivated to release the sheet 86. The advanced predetermined length of material collects in trough 71.

A fold 91 is formed laterally of the advanced sheet 86, withdrawn from trough 71, and the fold 91 is disposed between the lower support plates 80 and their opposed upper welders and cutters 82. The fold 91 is formed by a pair of fold lines 93 extending laterally between the opposed longitudinal side edges of the sheet 86; the fold 91 has outer fold edges defined by the side edges of sheet 86. The welders and cutters 82 are activated through lines 85 by pneumatic power unit 84 to simultaneously remove outer end portions of the fold 91 thereby forming fresh outwardly facing fold edges and seal the fresh fold edges together to form a pillow element 92. The outer end portions which are removed are spaced inwardly of the fold lines.

The sheet 86 with the completed pillow elements 92 is fed onto, and supported by platform 79.

As can be seen in FIG. 6, the welder and cutter 82 includes a welding and cutting element 94, having an inner welding edge 96 and an outer cutting edge 98.

It will be understood that welder and cutters 82 may function to simultaneously cut the outer portions and form a seam, or the cutting and seaming can take place sequentially, either cutting followed by seaming or seaming followed by cutting.

Figure 7:
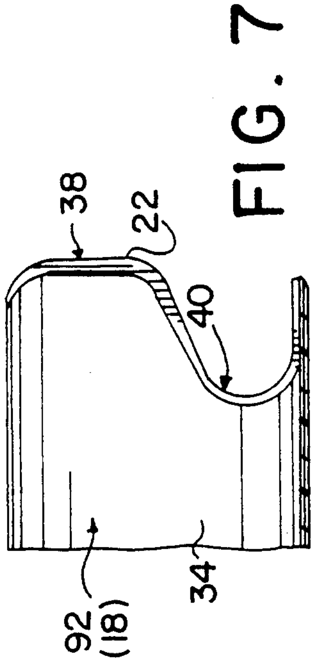
FIG. 7 is a detail of an end portion of the sheet product formed by the apparatus of FIG. 6 which forms the upper layer of the mattress of FIG. 1.

With further reference to FIG. 7, a detail of the end of the fold 91 in the resulting pillow element 92 is illustrated and it will be seen that the contour of the end of the pillow element corresponds to the shape of the welding and cutting element 94. The procedure is repeated until a desired number of pillow elements 92 is formed.

Figure 9:
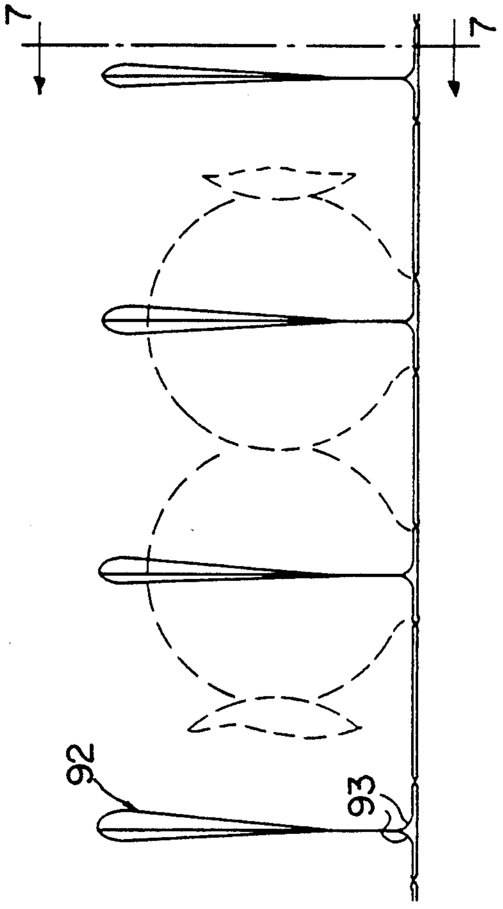
FIG. 9 is a detail of the sheet product formed in the apparatus of FIGS. 6 and 8 which forms the upper layer of the mattress of FIG. 1.

With further reference to FIG. 9, there is illustrated schematically a portion of the sheet material 86 with pillow elements 92. In broken line there is illustrated schematically in FIG. 9 the manner in which the pillow elements 92 inflate and billow against each other.

After formation of a required length of upper layer 12, such length is severed from sheet 86 and the resultant upper layer 12 is disposed over an equivalent length of a lower layer 14 and a peripheral seam 20 is formed between the upper and lower layers 12 and 14 to form an enclosure with an air chamber between layers 12 and 14. The air inlet 26 may be formed in advance in lower layer 14 or may be formed after formation of the peripheral seam 20. Air inlet 26 may typically comprise an annular plastic element secured at an opening in lower layer 14, and having a thread or similar connecting element on its outer surface whereby it may be connected to a hose for introduction of air under pressure.

In a subsequent operation spacer seams 24 are formed between the pillow elements 92 and air escape orifices 28 are punched in the pillows 18. The spacer seams 24 define the non-inflatable cavities 50 which represent spacer zones air sealed from the air chamber and being spaced from the peripheral seam 20 and from the adjacent fold lines 93 of the folds 91 initially defining the pillow elements 92.

The spacer seams 24 are formed by a welder of elongate rectangular outline. The enclosure is typically supported with lower layer 14 on a support surface and the rectangular welder is urged into engagement with upper layer 12 between a pair of adjacent pillow elements 92 to form a rectangular weld spacer seam 24 between upper layer 12 and lower layer 14. This operation is repeated to form identical spacer seams 24 between each pair of pillow elements 92. The spacer seams 24 can also be formed prior to formation of peripheral seam 20, although this is less preferred.

In a particular embodiment the sheet material 86 and the corresponding sheet material which forms lower layer 14 are of air impervious material, for example, PVC (polyvinylchloride) which is heat sealable by radio frequency energy. It will be understood that the seams 20, 22 and 24 are air impervious.

In the case of a mattress 10 having a length of about 82 in., and 20 elongate pillows 18, the lower layer 14 is suitably formed from a sheet of PVC having a length of 82 in. and the upper layer 12 of PVC is suitably formed from a sheet of PVC having a length of about 270 in. The folds 91 formed in the sheet forming upper layer 12 have a height of about 4.625 in. and each non-inflated cavity 50 defined by a spacer seam 24 has a width of 3.625 in. defining the separation between adjacent pillows 18. The width of the base of each pillow 18 is 1.5 in. representing the closest spacing of adjacent seams 24 separated by a pillow 18.

The resulting pillows 18 thus have an inflated diameter (approximating them to a circle) of about 4 in.

In general the dimensions are such that the pillows 18 have a height greater than their width with the spacing between opposed roots of adjacent pillows 18 being less than the height of the pillows 18. In this way adjacent pillows billow against each other on inflation thereby producing a multiplicity of small elongate creases or folds and relieving the bursting pressure in the region of the seams. The upper layer 12 is formed from a length of sheet material typically 2.5 to 3.5 times the length of the lower layer 14, to accommodate the plurality of folds 91 defining the pillow elements 92.

I claim:

1. A method for the production of an air mattress comprising:

(i) feeding a first predetermined length of flexible air impervious material having a pair of spaced apart longitudinal edges, from a supply, (ii) forming a laterally extending fold in said first predetermined length, said fold being defined by fold lines extending laterally between said spaced apart longitudinal edges, (iii) forming an air impervious seam at opposed ends of each fold, (iv) repeating steps (i) to (iii) a predetermined number of times to produce a desired length of said flexible, air impervious material having a plurality of pillow-forming elements defined by the laterally extending folds in side-by-side relationship, in which each fold is seamed at outer ends thereof, (v) severing the desired length in iv) from said supply to provide a flexible, elongate upper layer-forming member having spaced apart longitudinal edges and spaced apart end edges, (vi) disposing said upper layer-forming member on a lower layer of a flexible, air impervious material having spaced apart longitudinal edges and spaced apart end edges in opposed relationship with the corresponding edges of said upper layer-forming member, (vii) seaming said opposed edges to form an air chamber between said upper layer-forming member and said lower layer, and joining opposed portions of said upper and lower layers together between adjacent pillow-forming elements.

2. A method according to claim 1, wherein said fold in step (ii) has outer fold edges defined by a second predetermined length of said longitudinal edges.

3. A method according to claim 2, wherein step (iii) comprises:

(a) removing end portions of said fold extending from the outer fold edges to form fresh outwardly facing fold edges, said end portions being spaced from said fold lines, and (b) seaming said fresh fold edges to form an air impervious seam at opposed ends of the fold.

4. A method according to claim 3, wherein steps (a) and (b) are carried out simultaneously.

5. A method according to claim 3, wherein steps (a) and (b) are carried out sequentially with step (a) preceding step (b).

6. A method according to claim 3, wherein steps (a) and (b) are carried out sequentially with step (a) following step (b).

7. A method according to claim 1, wherein step (vii) comprises:

(a) seaming the opposed edges to form the air chamber between the upper layer-forming member and the lower layer, and (b) joining opposed portions of the upper and lower layers together between adjacent pillow elements to form laterally extending spacer zones such that each spacer zone is air-sealed from the chamber and spaced from the seamed longitudinal edges of the chamber and from the fold lines of adjacent folds between which such spacer zone extends.

8. A method according to claim 7, wherein steps (a) and (b) are carried out sequentially with step (a) preceding step (b).

9. A method according to claim 7, wherein steps (a) and (b) are carried out sequentially with step (a) following step (b).

* * * * *